've
United States Patent

Borgholte et al.

[11] Patent Number: 6,113,988
[45] Date of Patent: Sep. 5, 2000

[54] 3-COMPONENT COATING COMPOSITION OF HIGH SOLVENT RESISTANCE AND HIGH MASKING RESISTANCE

[75] Inventors: Harald Borgholte, Senden; Olaf Hallmann, Münster, both of Germany

[73] Assignee: BASF Coatings Ag, Muenster-Hiltrup, Germany

[21] Appl. No.: 09/043,368

[22] PCT Filed: Aug. 26, 1996

[86] PCT No.: PCT/EP96/03754

§ 371 Date: Apr. 30, 1998

§ 102(e) Date: Apr. 30, 1998

[87] PCT Pub. No.: WO97/12004

PCT Pub. Date: Apr. 3, 1997

[30] Foreign Application Priority Data

Sep. 25, 1995 [DE] Germany .......................... 195 35 603

[51] Int. Cl.[7] .................. B05D 7/16; C08J 3/00; C08F 8/00; C08L 75/00
[52] U.S. Cl. .................. 427/407.1; 427/387; 427/409; 524/513; 524/523; 525/100; 525/123; 525/131; 525/477; 525/479; 528/486; 528/491
[58] Field of Search .......................... 524/513, 523; 528/486, 491; 427/407.1, 409, 387; 428/423.1; 525/123, 131, 479, 477, 100

[56] References Cited

U.S. PATENT DOCUMENTS

| | | | |
|---|---|---|---|
| 4,291,135 | 9/1981 | Höhlein et al. | 427/388.5 |
| 4,382,114 | 5/1983 | Hohlein et al. | 428/423.1 |
| 4,397,989 | 8/1983 | Adesko | 427/409 |
| 4,528,319 | 7/1985 | Ottaviani et al. | 524/540 |
| 4,578,426 | 3/1986 | Lenz et al. | 525/131 |
| 4,673,718 | 6/1987 | Ryntz et al. | 525/476 |
| 4,754,014 | 6/1988 | Ryntz et al. | 528/28 |
| 4,804,732 | 2/1989 | Ryntz et al. | 528/28 |
| 4,873,298 | 10/1989 | Ryntz | 525/479 |
| 5,051,473 | 9/1991 | Tabuchi et al. | 525/100 |
| 5,183,876 | 2/1993 | Kopp et al. | 528/59 |
| 5,326,820 | 7/1994 | Hoffmann et al. | 525/123 |
| 5,426,151 | 6/1995 | Brandt et al. | 525/100 |
| 5,460,892 | 10/1995 | Bederke et al. | 428/482 |
| 5,658,617 | 8/1997 | Gobel et al. | 427/372.2 |
| 5,681,622 | 10/1997 | Vogt-Birnbrich et al. | 427/407.1 |
| 5,688,859 | 11/1997 | Schneider et al. | 524/591 |
| 5,760,123 | 6/1998 | Vogt-Birnbrich et al. | 524/500 |
| 5,876,802 | 3/1999 | Brunnemann et al. | 427/409 |

FOREIGN PATENT DOCUMENTS

| | | |
|---|---|---|
| 0 006 517 A1 | 6/1979 | European Pat. Off. . |
| 0 029 598 A1 | 11/1980 | European Pat. Off. . |
| 0175092 B1 | 7/1985 | European Pat. Off. . |
| WO92/02590 | 2/1992 | European Pat. Off. . |
| 0603561 A1 | 11/1993 | European Pat. Off. . |
| WO 93/00380 | 11/1993 | European Pat. Off. . |
| 4124167 A1 | 7/1991 | Germany . |
| 44 32 260 C1 | 9/1994 | Germany . |
| 02163177 | 6/1990 | Japan . |
| 4-209679 | 7/1992 | Japan . |

*Primary Examiner*—Diana Dudash

[57] ABSTRACT

The invention relates to coating compositions comprising:

(A) from 5 to 60% by weight of at least one polyester-modified polyacrylate resin consisting of:

(a1) from 20 to 60% by weight of at least one polyester and (a2) from 40 to 80% by weight of at least one hydroxyl-containing polyacrylate resin which has been prepared at least in part in the presence of component (a1), (B) from 1 to 35% by weight of at least one hydroxyl-containing, siloxane-modified polyacrylate resin, and (C) from 5 to 50% by weight of an isocyanate crosslinking agent, and to a process for the production of a protective and/or decorative coating with such coating compositions, and to their use as topcoats and refinish coating materials.

23 Claims, No Drawings

3-COMPONENT COATING COMPOSITION OF HIGH SOLVENT RESISTANCE AND HIGH MASKING RESISTANCE

FIELD OF THE INVENTION

The invention relates to coating compositions BM comprising (A) from 5 to 60% by weight of at least one polyester-modified acrylate resin, (B) from 1 to 35% by weight of at least one hydroxyl-containing, siloxane-modified polyacrylate resin, and (C) from 5 to 50% by weight of a crosslinking agent, and to the use of the coating compositions BM in the field of automotive finishing or as a constituent of multicoat finishing systems.

BACKGROUND OF THE INVENTION

Very high quality requirements are imposed in particular on coating compositions employed in the area of automotive refinishing. For instance, these coating compositions must be fully curable at low temperatures (<100 degrees C., preferably<80 degrees C.) and in this context should be dust-dry and tack-free even after less than 7 hours. Moreover, good solvent resistance, weathering resistance, masking resistance, yellowing resistance, sandability and a low inherent color of the resulting coatings are required. In addition to this, the coatings must be able to be overpainted in order thus to insure that it is also possible to repair paint damage in the adjacent area.

In the area of the finishing of large-size vehicles, for example the finishing of truck bodies, the masking resistance of the resulting coatings is of particular importance. Large-size vehicles are commonly provided with written characters for whose application it is necessary to mask off the adjacent area. If the masking resistance is inadequate, the marks must be removed manually, by laborious sanding and polishing, which entails a considerable financial outlay.

DE-A-41 24 167 discloses clearcoats for automotive finishing which as binders contain copolymers in which from 9 to 20% by weight of a methoxy-functional polysiloxane has been incorporated by condensation. These clearcoats however, owing to the high proportion of polysiloxane, have the disadvantage that the topcoat holdout or the leveling of the clearcoats is adversely affected.

Furthermore, EP-A-603 561 discloses coating compositions which as binders contain copolymers in which from 3 to 40% by weight of an alpha,omega-hydroxy-, -carboxy- and/or -epoxy-functional polysiloxane has been incorporated by polymerization.

JP-A-2-163177 comprises a coating composition based on hydroxyl-containing acrylate copolymers and polyisocyanates which is employed, in particular, as a masonry coating composition. In this case the coatings are notable for improved weathering stability, which is obtained by copolymerization of from 0.5 to 15% by weight of a polysiloxane macromonomer into the hydroxyl-containing acrylate copolymer. The use of a reaction product of acrylic and/or methacrylic acid with the glycidyl ester of an alpha-branched monocarboxylic acid having 5 to 18 carbon atoms as monomer component, however, is not described in this document.

These coating compositions known from JP-A-2-163177 have, in particular, the disadvantage that the topcoat holdout or leveling of the coating compositions described is adversely affected by the high siloxane content of the copolymers which are employed as binder.

U.S. Pat. No. 4,754,014 discloses coating compositions based on hydroxyl-containing acrylate copolymers which are modified with polysiloxane macromonomers. The polysiloxane macromonomers are prepared by reacting a hydroxy-functional polysiloxane with an epoxy-functional acrylate. These coating compositions known from U.S. Pat. No. 4,754,014 exhibit a high flexibility and are therefore particularly suitable for the coating of plastics materials, for example fenders. These coating compositions differ from the coating compositions of the present application, in particular, in that the use of a reaction product of acrylic and/or methacrylic acid with the glycidyl ester of an alpha-branched monocarboxylic acid having 5 to 18 carbon atoms per molecule as monomer component for preparing the hydroxy- functional acrylate copolymers, and the specific combination of hydroxy-functional acrylate component, polyester-modified polyacrylate and crosslinking component, is not described in this document.

Finally, EP-B-175 092 discloses that the flow properties and the lubricity and mar resistance of coatings can be improved by adding polyester-modified siloxanes which are free from polyether groups to the coating compositions. The use of polymerizable, ethylenically unsaturated polysiloxane macromonomers to modify binders based on acrylate copolymers is not described in EP-B-175 092.

The as yet unpublished U.S. patent application Ser. No. 08/396,028 comprises a coating composition consisting of (A) at least one hydroxyl-containing polyacrylate resin, containing as comonomer units polysiloxane macromonomers (a5) and reaction products of acrylic and/or methacrylic acid with the glycidyl ester of an alpha-branched monocarboxylic acid having 5 to 18 carbon atoms per molecule (a3), of (B) at least one isocyanate crosslinking agent and, if desired, of (C) at least one hydroxyl-containing, polyester-modified polyacrylate resin. The present invention differs from the U.S. patent application Ser. No. 08/396,028 by the presence, in accordance with the invention, of component (C) in specific proportions by weight relative to the binder.

The likewise as yet unpublished German Patent Application 195 19 807.7 describes coating compositions comprising (A) at least one hydroxyl-containing component consisting of (A1) at least one polyester and (A2) at least one hydroxyl-containing polyacrylate resin which has been prepared at least partially in the presence of component (A1), and (B) at least one crosslinking agent. Furthermore, the as yet unpublished German Patent Application 195 19 807.7 also describes the use of such coating compositions in processes for the production of protective and/or decorative coatings on substrate surfaces and the use of the coating compositions in the area of automotive refinishing. The additional use of hydroxyl-containing acrylate copolymers with polysiloxane macromonomers and reaction products of acrylic and/or methacrylic acid with the glycidyl ester of an alpha-branched monocarboxylic acid having 5 to 18 carbon atoms per molecule as comonomer units is not described in P 195 19 807.7.

SUMMARY OF THE INVENTION

The object of the present invention is to provide coating compositions, based on hydroxyl-containing polyacrylate resins and isocyanate crosslinking agents, which lead to overcoatable coatings having good weathering resistance and good solvent and chemical resistance. In order to be able to be employed in the area of automotive refinishing, the coating compositions should additionally be curable at low temperatures and in this context should lead to dust-dry and tack-free surfaces after as short a time as possible.

Moreover, the coating compositions should be sandable, should possess overcoatability even without sanding and should have good masking resistance and spray-mist uptake. These properties should be achieved even if the coating compositions are applied at low temperatures, for example at about 10 degrees C. Furthermore, there was a pronounced requirement for a particularly mar-resistant and solvent-resistant topcoat with so-called maintenance-free properties, i.e. in particular long-term dirt repellency and water repellency, for large-size vehicles as are employed, for example, in local public transport.

This object is achieved, surprisingly, by a coating composition BM comprising:

(A) from 5 to 60% by weight of at least one polyester-modified polyacrylate resin consisting of:
  (a1) from 20 to 60% by weight of at least one polyester and
  (a2) from 40 to 80% by weight of at least one hydroxyl-containing polyacrylate resin which has been prepared at least in part in the presence of component (a1), (B) from 1 to 35% by weight of at least one hydroxyl-containing, siloxane-modified polyacrylate resin, consisting of:
  (b1) an essentially carboxyl-free (meth)acrylic ester which is different from (b2), (b3), (b4), (b5), (b6) and (b7) and is copolymerizable with (b2), (b3), (b4), (b5), (b6) and (b7), or a mixture of such monomers,
  (b2) an ethylenically unsaturated monomer which carries at least one hydroxyl group per molecule, is essentially free from carboxyl groups, is copolymerizable with (b1), (b3), (b4), (b5), (b6) and (b7) and is different from (b3), or a mixture of such monomers,
  (b3) if desired, at least one reaction product of acrylic acid and/or methacrylic acid with the glycidyl ester of an alpha-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an alpha-branched moncarbon [sic] acid having 5 to 18 carbon atoms per molecule,
  (b4) if desired, an ethylenically unsaturated monomer which carries at least one carboxyl group per molecule and is copolymerizable with (b1), (b2), (b3), (b5), (b6) and (b7), or a mixture of such monomers,
  (b5) a polysiloxane macromonomer having a number-average molecular weight Mn of from 1000 to 40,000 daltons and on average from 0.5 to 2.5 ethylenically unsaturated double bonds per molecule or having on average from 0.5 to 2.5 epoxide groups per molecule, or a mixture of such macromonomers,
  (b6) a vinyl-aromatic hydrocarbon or a mixture of different vinyl-aromatic hydrocarbons, and
  (b7) if desired, an ethylenically unsaturated monomer which is copolymerizable with (b1), (b2), (b3), (b4), (b5) and (b6), is different from (b1), (b2), (b3), (b4), (b5) and (b6) and is essentially free from carboxyl groups, or a mixture of such monomers, and (C) from 5 to 50% by weight of at least one crosslinking agent The component (A) of the novel coating composition is preferably such that:

1.) the polyester (a1) has an OH number of between 90 and 130 mg of KOH/g, an acid number of less than 10 mg of KOH/g, a number-average molecular weight Mn of between 1300 and 3500 daltons and a polydispersity of between 5 and 50, 2.) the polyacrylate resin (a2) contains, incorporated by polymerization, one or more monomers selected from the group 4-hydroxy-n-butyl acrylate, 4-hydroxy-n-butyl methacrylate, 3-hydroxy-n-butyl acrylate, 3-hydroxy-n-butyl methacrylate and/or hydroxyethyl methacrylate, 3.) the polyacrylate resin (a2) has an OH number of between 50 and 150 mg of KOH/g and an acid number of between 0 and 10 mg KOH/g, and 4.) from 0.1 to 1% by weight, based on the weight of the component (A) without solvents, of at least one aromatic mono- and/or polycarboxylic acid and/or of an anhydride of an aromatic polycarboxylic acid is added to the component (A) after its preparation or to the coating composition.

In further preferred embodiments of the invention the component (A) consists of from 30 to 50% by weight of at least one polyester (a1) and from 50 to 70% by weight of at least one polyacrylate resin (a2), from 0.4 to 0.9% by weight, based on the weight of the component (A) without solvent, of at least one aromatic mono- and/or polycarboxylic acid and/or of an anhydride of an aromatic polycarboxylic acid is added to the component (A) following its preparation or to the coating composition, the polyacrylate resin (a2) is obtainable by polymerization of:
  (a) from 5 to 50% by weight, preferably from 10 to 35% by weight, of one or more monomers selected from the group 4-hydroxy-n-butyl (meth)acrylate, 3-hydroxy-n-butyl (meth)acrylate and/or hydroxyethyl methacrylate,
  (b) from 0 to 50% by weight, preferably from 0 to 30% by weight, of a hydroxyl-containing, ethylenically unsaturated, copolymerizable monomer which is different from (a), or of a mixture of such monomers,
  (c) from 5 to 95% by weight, preferably from 15 to 55% by weight, of an aliphatic and/or cycloaliphatic ester of acrylic and/or methacrylic acid which is different from (a) and (b), or of a mixture of such monomers,
  (d) from 0 to 30% by weight, preferably from 5 to 15% by weight, of a copolymerizable vinyl ester which is different from (a), (b) and (c), or of a mixture of such monomers,
  (e) from 0 to 85% by weight, preferably from 15 to 60% by weight, of a vinyl-aromatic hydrocarbon which is different from (a), (b), (c) and (d), or of a mixture of such monomers, and
  (f) from 0 to 10% by weight, preferably from 0 to 8% by weight, of a further ethylenically unsaturated monomer which is different from (a), (b), (c), (d) and (e), or of a mixture of such monomers at least partially in the presence of the component (a1), the sum of the proportions by weight of the monomers (a) to (f) being in each case 100% by weight.

The quantity of the polysiloxane macromonomer or macromonomers (b5) employed to modify the hydroxyl-containing polyacrylate resins (B) is preferably less than 3% by weight, particularly preferably between 0.1 and 1% by weight, very particularly preferably from 0.3 to 0.7% by weight, based in each case on the overall weight of the monomers employed to prepare the polyacrylate resin (B).

Preference extends to polyacrylate resins (B) which are prepared by polymerization of:

(b1) from 5 to 74% by weight, preferably from 5 to 30% by weight, of the component (b1), (b2) from 10 to 40% by weight, preferably from 15 to 25% by weight, of the component (b2), (b3) from 0 to 50% by weight, preferably from 10 to 50% by weight, of the component (b3), (b4) from 0 to 10% by weight, preferably from 0.1 to 6% by weight, of the component (b4), (b5) less than 3% by weight, preferably from 0.1 to 1% by weight and, with particular preference, from 0.3 to 0.7% by weight of the component (b5), (b6) from 5 to 40% by weight, preferably from 10 to 30% by weight of the component (b6), and (b7) from 0 to 40% by weight, preferably from 0 to 30% by weight, of the component (b7), the sum of the proportions by weight of the components (b1) to (b7) being in each case 100% by weight.

DETAILED DESCRIPTION OF THE PREFERRED EMBODIMENT

The Polyester-modified Polyacrylate Resin (A)

The polyesters (a1) are preferably obtainable by reacting (p1) polycarboxylic acids, or their esterifiable derivatives, together if desired with monocarboxylic acids, (p2) polyols, together if desired with monoalcohols, (p3) if desired with further modifying components, and (p4) if desired, a component which is reactive with the reaction product of (p1), (p2) and, if used, (p3).

Examples of polycarboxylic acids which can be employed as component (p1) are aromatic, aliphatic and cycloaliphatic polycarboxylic acids. As component (p1) it is preferred to employ aromatic and/or aliphatic polycarboxylic acids. Examples of suitable polycarboxylic acids are phthalic acid, isophthalic acid, terephthalic acid, halophthalic acids, such as tetrachloro- and tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-, 1,3- and 1,4-cyclohexanecarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid and others. The cycloaliphatic polycarboxylic acids can be employed both in their cis form and in their trans form and also as a mixture of both forms. Also suitable are the esterifiable derivatives of the abovementioned polycarboxylic acids, such as, for example, their mono- or polyesters with aliphatic alcohols having 1 to 4 carbon atoms or hydroxy alcohols having 1 to 4 carbon atoms. It is also possible, moreover, to employ the anhydrides of the abovementioned acids, provided they exist.

If desired it is possible, together with the polycarboxylic acid, to employ monocarboxylic acids as well, such as, for example, benzoic acid, tert-butylbenzoic acid, lauric acid, isononanoic acid and fatty acids of naturally occurring oils. Isononanoic acid is preferably employed as monocarboxylic acid.

Suitable alcohol components (p2) for preparing the polyesters and/or alkyd resins (a1) are polyhydric alcohols, such as ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl isocyanate, polyethylene glycol, polypropylene glycol, together if desired with monohydric alcohols, for example butanol, octanol, lauryl alcohol, and also ethoxylated and/or propoxylated phenols.

Particularly as components (p3) for preparing the polyesters (a1) are compounds having a group which is reactive toward the functional groups of the polyester, with the exception of the compounds mentioned as component (p4). As modifying component (p3) it is preferred to use polyisocyanates and/or diepoxide compounds, and possibly also monoisocyanates and/or monoepoxide compounds. Examples of suitable components (p3) are described in DE-A-40 24 204 on page 4, lines 4 to 9.

Compounds suitable as component (p4) to prepare the polyesters and/or alkyd resins (a1) are compounds having not only a group which is reactive toward the functional groups of the polyester (a1) but also a tertiary amino group, examples being monoisocyanate having at least one tertiary amino group or mercapto compounds having at least one tertiary amino group. In respect of further details, reference is made to DE-A-40 24 204, page 4, lines 10 to 49.

The polyesters (a1) are prepared by the known methods of esterification, as are described, for example, in:

1. Temple C. Patton, Alkyd Resin Technology, Interscience Publishers John Wiley & Sons, New York, London, 1962;
2. Dr. Johannes Schreiber, Chemie und Technologie der kunstlichen Harze, Wissenschaftliche Verlagsgesellschaft mbH, Stuttgart, 1943;
3. Hans Wagner, Karl-Friedrich Sarx, Lackkunstharze, 4th edition, Carl Hanser Verlag, Munich, 1959;
4. Ullmanns Enzyklopadie der technischen Chemie, volume 14, pages 80 to 106, 1963.

The reaction is usually carried out at temperatures between 180 and 280 degrees C., optionally in the presence of an appropriate esterification catalyst such as, for example, lithium octoate, dibutyltin oxide, dibutyltin dilaurate, p-toluenesulfonic acid or others.

The preparation of the polyesters (a1) is normally carried out in the presence of small quantities of an appropriate solvent as entraining agent. Examples of entraining agents employed are aromatic hydrocarbons, such as xylene in particular, and (cyclo)aliphatic hydrocarbons, such as cyclohexane, for example.

The polyacrylates employed as component (a2) in the novel coating compositions have OH numbers of between 50 and 150, preferably between 75 and 105, mg of KOH/g and acid numbers of between 0 and 10, preferably between 0 and 8, mg of KOH/g, the OH numbers and acid numbers being calculated in each case without taking into account the polyester fraction. The number-average molecular weights of the polyacrylate resins prepared in the presence of the polyesters are usually between 1500 and 5000, preferably between 2000 and 4000 daltons, determined by gel permeation chromatography (GPC) using polystyrene as standard.

It is essential to the invention that the polyacrylate resin (a2) is prepared at least partially in the presence of the polyester resin (a1). Advantageously, at least 40% by weight and, particularly advantageously, between 50 and 70% by weight of the component (a2) is prepared in the presence of the component (a1). The residual quantity, if any, of the component (a2) is subsequently added to the binder solution and/or to the coating composition. In this case it is possible for this already polymerized resin to have the same monomer composition as the polyaddition resins synthesized in the presence of the polycondensation resin. It is also possible, however, to add a hydroxyl-containing polyaddition resin and/or polycondensation resin having a different monomer composition. Moreover, it is possible to add a mixture of different polyaddition and/or polycondensation resins in which case, optionally, one resin has the same monomer composition as the polyaddition resins synthesized in the presence of the polycondensation resin.

It is additionally preferable for the polyacrylate resin (a2) to contain, incorporated by polymerization, one or more monomers selected from the group 4-hydroxy-n-butyl (meth)acrylate, 3-hydroxy-n-buty (meth)acrylate and/or hydroxyethyl methacrylate as monomer components.

The polyacrylate resins employed in accordance with the invention can be prepared by the generally known polymerization techniques (compare for example: HoubenWeyl, Methoden der organischen Chemie, 4th edition, volume 14/1, pages 24 to 255, 1961).

The polyacrylate resins employed in accordance with the invention are preferably prepared by means of solution polymerization. In this technique, an organic solvent or solvent mixture is normally introduced together with the polyester (a1) and the mixture is heated to boiling. The monomer mixture to be polymerized and one or more polymerization initiators are then added continuously to this mixture of organic solvent (mixture) and polyester resin (a1). Polymerization takes place at temperatures between 100 and 160, preferably between 130 and 150 degrees C. The polymerization is preferably carried out in a high-boiling, organic solvent which is inert toward the monomers employed. Examples of suitable solvents are: relatively highly substituted aromatic compounds, for example Solvent Naphtha®, heavy benzene, various Solvesso® grades, various Shellsol® grades and Deasol®, and also relatively high-boiling aliphatic and cycloaliphatic hydrocarbons, for example various white spirits, mineral turpentine oil, tetralin and decalin and also various esters, for example ethylglycol acetate, butylglycol acetate, ethylglycol diacetate and others.

As polymerization initiators use is preferably made of initiators which form free radicals, the nature and quantity of the initiator usually being chosen such that during the feed phase at the polymerization temperature there is a flow of radicals which is as constant as possible.

Examples of initiators which can be employed are: di-tert-butyl peroxide, tert-butyl hydroperoxide, tert-butyl peracetate, tert-butyl peroxybenzoate, tert-butyl peroxypivalate, tert-butyl peroxy-3,5,5-trimethylhexanoate, tert-butyl peroxy-2-ethylhexanoate, dicumyl peroxide, cumyl hydroperoxide, tert-amyl peroxybenzoate, tert-amyl peroxy-2-ethylhexanoate, diacyl peroxides, for example diacetyl peroxide, peroxyketals, 2,2-di-(tert-amylperoxy) propane, ethyl 3,3-di-(tert-amylperoxy-)butyrate and thermally unstable highly substituted etane ethane derivatives, based for example on silyl-substituted ethane derivatives and based on benzopinacol. Furthermore, it is also possible to employ azo compounds, such as, for example, azo-bis-isovaleronitrile, azo-bis-cyclohexanenitrile or azo-bis-isobutyronitrile.

Use is made in particular of initiators containing tert-butyl groups, such as, for example, di-tert-butyl peroxide, tert-butyl hydroperoxide, 2,2-di-tert-utylperoxybutane and 1,3-bis(tert-butylperoxyisopropyl)benzene, since they promote grafting of the olyacrylate onto the polyester.

The quantity of initiator is in most cases from 0.1 to 8% by weight, based on the monomers employed, but can also be even higher if appropriate. The initiator, dissolved in a portion of the solvent employed for the polymerization reaction, is metered in gradually during the polymerization reaction. The initiator feed preferably lasts from about 0.5 to 2 hours longer than the monomer feed, in order thus to obtain an effective action during the post-polymerization phase as well. In another preferred preparation variant, the initiator feed is begun about 15 minutes before the addition of the monomers, in order thus to provide a high supply of radicals at the beginning of the polymerization. Where initiators are employed which have only a low decomposition rate under the prevailing reaction conditions, then it is also possible to charge the initiator to the reaction vessel initially.

The polymerization conditions, such as reaction temperature, feed time of the monomer mixture, nature and quantity of the organic solvent, polymerization initiators and, possibly, molecular weight regulators, for example mercaptans, thioglycolic esters or halogenated hydrocarbons, are selected such that the polyacrylate resins employed in accordance with the invention have the desired molecular weight.

The acid number of the novel polyacrylate resins can be adjusted by the person skilled in the art by the use of appropriate quantities of carboxyl-containing monomers. Similar comments apply to the adjustment of the OH number, which can be controlled by way of the quantity of hydroxyl-containing monomers employed.

As component (a2) it is preferred to employ hydroxyl-containing polyacrylate resins which are obtainable by:

(a) from 5 to 50% by weight, preferably from 10 to 35% by weight, of one or more monomers selected from the group 4-hydroxy-n-butyl (meth)acrylate, 3-hydroxy-n-butyl (meth)acrylate and/or hydroxyethyl methacrylate, (b) from 0 to 50% by weight, preferably from 0 to 30% by weight, of a hydroxyl-containing, ethylenically unsaturated, copolymerizable monomer which is different from (a), or of a mixture of such monomers, (c) from 5 to 95% by weight, preferably from 15 to 55% by weight, of an aliphatic and/or cycloaliphatic ester of acrylic and/or methacrylic acid which is different from (a) and (b), or of a mixture of such monomers, (d) from 0 to 30% by weight, preferably from 5 to 15% by weight, of a copolymerizable vinyl ester which is different from (a), (b) and (c), or of a mixture of such monomers, (e) from 0 to 85% by weight, preferably from 15 to 60% by weight, of a vinyl-aromatic hydrocarbon which is different from (a), (b), (c) and (d), or of a mixture of such monomers, and (f) from 0 to 10% by weight, preferably from 0 to 8% by weight, of a further ethylenically unsaturated monomer which is different from (a), (b), (c), (d) and (e), or of a mixture of such monomers at least partially in the presence of the component (A1), the sum of the proportions by weight of monomers (a) to (f) being in each case 100% by weight.

As a further hydroxyl-containing monomer (component (b)) for the preparation of the acrylate resin it is possible if it is desired to employ yet further hydroxyl-containing esters of acrylic and/or methacrylic acid. Examples of hydroxyl-containing monomers suitable as component (b) are, in particular, the reaction product of 1 mol of hydroxyethyl acrylate and/or hydroxyethyl methacrylate and on average 2 mol of epsilon-caprolactone and/or the reaction product of acrylic acid and/or methacrylic acid with the glycidyl ester of a carboxylic acid having a tertiary carbon atom. These glycidyl esters of carboxylic acids which are branched on the alpha carbon atom and have 11 to 13 carbon atoms (Versatic acid) are obtainable commercially, for example, under the name Cardura® from Shell. The reaction of the acrylic and/or methacrylic acid with the glycidyl ester can in this case be carried out before, during or after the polymerization. As component (b) it is also possible, however, to employ alkyl esters of (meth)acrylic acid, such as, for example, hydroxyethyl acrylate, hydroxypropyl (meth) acrylate, hydroxypentyl (meth)acrylates, hydroxyoctyl (meth)acrylates and the like, and/or hydroxyl-containing esters of a polymerizable ethylenically unsaturated carboxylic acid which are different from (a), for example the hydroxy-containing esters of crotonic and isocrotonic acid.

As component (c) it is possible in principle to employ any aliphatic or cycloaliphatic ester of acrylic acid or methacrylic acid which is different from (a) and (b), or a mixture of such monomers. Examples which may be mentioned are: aliphatic esters of (meth)acrylic acid, such as methyl, ethyl, propyl, n-butyl, isobutyl, tert-butyl, n-hexyl, 2-ethylhexyl, stearyl and lauryl (meth)acrylate and cycloaliphatic esters, such as furfuryl, cyclohexyl, isobornyl and tert-butylcyclohexyl (meth)acrylate.

As component (d), vinyl esters of monocarboxylic acids are employed. It is preferred to employ vinyl esters of alpha-branched monocarboxylic acids having 5 to 15 carbon atoms per molecule. The branched monocarboxylic acids can be obtained by the reaction of formic acid or carbon monoxide and water with olefins in the presence of a liquid, strongly acidic catalyst, it being possible for the olefins to be cracking products of paraffinic hydrocarbons, such as mineral-oil fractions, and to contain both branched and straight-chain acyclic and/or cycloaliphatic olefins. In the reaction of such olefins with formic acid or, respectively, with carbon monoxide and water a mixture of carboxylic acids is formed in which the carboxyl groups are located predominantly on a quaternary carbon atom. Examples of other olefinic starting materials are propylene trimer, propylene tetramer and diisobutylene. The vinyl esters can also be prepared in a manner known per se from the acids by, for example, reacting the acids with acetylene. Owing to their ready availability, particular preference is given to vinyl esters of saturated aliphatic monocarboxylic acids having 9 to 11 carbon atoms, which are branched on the alpha carbon atom.

Particular preference is given, moreover, to the vinyl ester of p-tert-butylbenzoic acid. Examples of other suitable vinyl esters are vinyl acetate and vinyl propionate.

As component (e) use is made of vinyl-aromatic hydrocarbons such as styrene, alpha-alkylstyrenes, such as alpha-methylstyrene, chlorostyrenes, o-, m- and p-methylstyrene, 2,5-dimethylstyrene, p-methoxystyrene, p-tert-butylstyrene, p-dimethylaminostyrene, p-acetamidostyrene and vinyltoluene, with preference being given to the use of vinyltoluenes and especially styrene.

As component (f) it is possible in principle to employ any ethylenically unsaturated monomer different from (a), (b), (c), (d) and (e), or a mixture of such monomers. Examples of monomers which can be employed as component (f) are: carboxyl-containing monomers, such as acrylic and/or methacrylic acid, amides of (meth)acrylic acid, such as (meth) acrylamide, nitriles of (meth)acrylic acid, vinyl ethers and vinyl esters.

After component (A) has been prepared, preferably from 0.1 to 1% by weight, particularly preferably from 0.4 to 0.9% by weight, of at least one aromatic mono- and/or polycarboxylic acid and/or at least one anhydride of an aromatic carboxylic acid is added to it. The quantity of acid or anhydride added in this case is based on the weight of the hydroxyl-containing binder calculated as solid resin, in other words without solvent fraction. In this context it is preferred to add phthalic anhydride and its half-esters, benzoic acid and/or alkyl- and/or alkoxy-substituted benzoic acid. With particular preference, benzoic acid is added.

The acid is preferably added at a temperature of from to 120 degrees C., particularly preferably at a temperature of from 40 to 100 degrees C. The anhydride is preferably added at temperatures of between 100 and 180, particularly preferably between 130 and 170, degrees C. The acid or the anhydride can in this case be added to the finished coating composition, in other words after the addition of pigments, fillers and auxiliaries and crosslinking agent (C). Preferably, however, the acid or the anhydride is added to the polyacrylate resin (a2) and is dispersed as homogeneously as possible.

The Hydroxyl-containing, Siloxane-modified Polyacrylate Resin (B)

It is essential to the invention that the polyacrylate resin (B) contains, as modifying comonomer units, polysiloxane macromonomers of a type which is yet to be described. Polysiloxane macromonomers (b5) suitable for the modification of the polyacrylate resin (B) are those having a number-average molecular weight Mn of from 1000 to 40,000, preferably from 2000 to 10,000, daltons and on average from 0.5 to 2.5, preferably from 0.5 to 2.0, ethylenically unsaturated double bonds per molecule or on average from 0.5 to 2.5, preferably from 0.5 to 2.0, epoxide groups per molecule.

The quantity of the polysiloxane macromonomer or macromonomers (b5) employed to modify the polyacrylate resins (B) is less than 5% by weight, preferably less than 3% by weight, particularly preferably from 0.1 to 1% by weight, very particularly preferably from 0.3 to 0.7% by weight, based in each case on the overall weight of the monomers required in order to prepare the polyacrylate resin (B).

The use of such polysiloxane macromonomers (b5) leads to a markedly improved masking resistance and solvent resistance of the resulting coatings.

The polyacrylate resin (B) employed in accordance with the invention is obtainable by polymerizing, in an organic solvent or solvent mixture and in the presence of at least one polymerization initiator, (b1) an essentially carboxyl-free (meth)acrylic ester which is different from (b2), (b3), (b4), (b5), (b6) and (b7) and is copolymerizable with (b2), (b3), (b4), (b5), (b6) and (b7), or a mixture of such monomers, (b2) an ethylenically unsaturated monomer which carries at least one hydroxyl group per molecule, is essentially free from carboxyl groups, is copolymerizable with (b1), (b3), (b4), (b5), (b6) and (b7) and is different from (b3), or a mixture of such monomers, (b3) if desired, at least one reaction product of acrylic acid and/or methacrylic acid with the glycidyl ester of an alpha-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an alpha-branched monocarboxylic acid having 5 to 18 carbon atoms per molecule, (b4) if desired, an ethylenically unsaturated monomer which carries at least one carboxyl group per molecule and is copolymerizable with (b1), (b2), (b3), (b5), (b6) and (b7), or a mixture of such monomers, (b5) a polysiloxane macromonomer having a number-average molecular weight Mn of from 1000 to 40,000 daltons and on average from 0.5 to 2.5 ethylenically unsaturated double bonds per molecule or having on average from 0.5 to 2.5 epoxide groups per molecule, or a mixture of such macromonomers, (b6) a vinyl-aromatic hydrocarbon or a mixture of different vinyl-aromatic hydrocarbons, and (b7) if desired, an ethylenically unsaturated monomer which is copolymerizable with (b1), (b2), (b3), (b4), (b5) and (b6), is different from (b1), (b2), (b3), (b4), (b5) and (b6) and is essentially free from carboxyl groups, or a mixture of such monomers, the nature and quantity of (b1), (b2), (b3), (b4), (b5), (b6) and (b7) being selected such that the polyacrylate resin (B) has the desired OH number and acid number, and the quantity of component (b5) being less than 5% by weight, based on the overall weight of the monomers employed in order to prepare the polyacrylate resin (B)

To prepare the polyacrylate resins (B) to be employed in accordance with the invention it is possible as component (b1) to employ any essentially carboxyl-free ester of (meth) acrylic acid which is copolymerizable with (b2), (b3), (b4), (b5), (b6) and (b7), or a mixture of such (meth)acrylic esters. Examples are alkyl (meth)acrylates having up to 20 carbon atoms in the ester radical, for example methyl, ethyl, propyl, butyl, hexyl, ethylhexyl, stearyl and lauryl (meth)acrylate. As component (b1) it is preferred to employ mixtures of alkyl (meth)acrylates consisting to the extent of at least 20% by weight, based on (b1), of n-butyl and/or tert-butyl acrylate and/or of n-butyl and/or tert-butyl methacrylate. As component (b1) it is also possible to employ ethyltriglycol (meth)acrylate and methoxyoligoglycol (meth)acrylate having number-average molecular weights Mn of preferably from 550 daltons or other ethoxylated and/or propoxylated hydroxyl-free (meth)acrylic acid derivatives.

As component (b2) it is possible to employ ethylenically unsaturated monomers which are copolymerizable with (b1), (b3), (b4), (b5), (b6) and (b7), are different from (b3), carry at least one hydroxyl group per molecule and are essentially free from carboxyl groups, or a mixture of such monomers. Examples are hydroxyalkyl esters of acrylic acid, methacrylic acid or another alpha,beta-ethylenically unsaturated carboxylic acid. These esters may be derived from an alkylene glycol which is esterified with an acid, or they can be obtained by transesterification of the acid with an alkylene oxide. As component (b2) it is preferred to employ hydroxyalkyl esters of (meth)acrylic acid, in which the hydroxyalkyl group contains up to 20 carbon atoms, reaction products of cyclic esters, for example epsilon-caprolactone and these hydroxyalkyl esters, or mixtures thereof.

Examples which may be mentioned are: 2-hydroxyethyl (meth)acrylate), 3-hydroxypropyl (meth)acrylate), 2-hydroxypropyl (meth)acrylate, 4-hydroxybutyl (meth) acrylate) and hydroxystearyl (meth)acrylate. Corresponding esters of other unsaturated acids, such as, for example, ethacrylic acid, crotonic acid and similar acids having up to 6 carbon atoms per molecule, may likewise be employed.

Furthermore, it is also possible to employ olefinically unsaturated polyols as component (b2). Thus as component (b2) it is possible at least in part to employ trimethylolpropane monoallyl ether. In this case the proportion of trimethylolpropane monoallyl ether is usually from 2 to 10% by weight, based on the overall weight of the monomers (b1) to (b7) employed in order to prepare the polyacrylate resin (B). In addition, however, it is also possible to add from 2 to 10 by weight, based on (B), of trimethylolpropane monoallyl ether to the finished polyacrylate resin (B). The olefinically unsaturated polyols, such as, in particular, trimethylolpropane monoallyl ether, can be employed as sole hydroxyl-containing monomer (b2), but in particular can be employed proportionally in combination with other of the hydroxyl-containing monomers (b2) mentioned.

As component (b3), use is made of the transesterification product of acrylic and/or methacrylic acid with the glycidyl ester of an alpha-branched monocarboxylic acid having 5 to 18 carbon atoms per molecule. Glycidyl esters of highly branched monocarboxylic acids are obtainable under the trade name "Cardura®". The reaction of the (meth)acrylic acid with the glycidyl ester of a carboxylic acid having a tertiary alpha carbon atom can be carried out before, during or after the polymerization reaction. As component (b3) it is preferred to employ the reaction product of acrylic and/or methacrylic acid with the glycidyl ester of Versatic acid. This glycidyl ester is obtainable under the trade name "Cardura® E10".

As component (b4) it is possible to employ any ethylenically unsaturated monomer which carries at least one carboxyl group per molecule and is copolymerizable with (b1), (b2), (b3), (b5), (b6) and (b7), or a mixture of such monomers. It is preferred as (b4) to employ acrylic and/or methacrylic acid. However, it is also possible to employ other ethylenically unsaturated acids having up to 6 carbon atoms in the molecule. Examples of such acids which may be mentioned are: ethacrylic acid, crotonic acid, maleic acid, fumaric acid and itaconic acid. As component (b4) it is also possible to employ mono(meth)acryloyloxyethyl maleate, mono(meth)acryloyloxyethyl succinate and mono(meth) acryloyloxyethyl phthalate.

Polysiloxane macromonomers which are suitable as components (b5) are those having a number-average molecular weight Mn of from 1000 to 40,000, preferably from 2000 to 10,000, daltons and on average from 0.5 to 2.5, preferably from 0.5 to 2.0, ethylenically unsaturated double bonds per molecule or on average from 0.5 to 2.5, preferably from 0.5 to 2.0, epoxide groups per molecule.

Examples of suitable polysiloxane macromonomers are those described in DE-A-38 07 571 on pages 5 to 7, in DE-A-37 06 095 in columns 3 to 7, in EP-B-358 153 on pages 3 to 6 and in U.S. Pat. No. 4,754,014 in columns 5 to 9. Furthermore, other acryloxysilane-containing vinyl monomers having the abovementioned molecular weights and contents of ethylenically unsaturated double bonds are also suitable, for example compounds which can be prepared by reacting hydroxy-functional silanes with epichlorohydrin and then reacting the reaction product with methacrylic acid and/or hydroxyalkyl esters of (meth)acrylic acid.

As component (b5) it is preferred to employ polysiloxane macromonomers of the following formula:

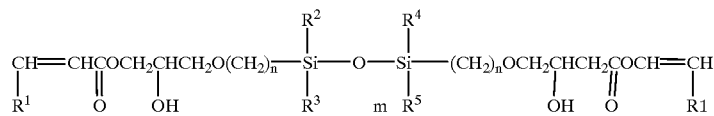

where $R^1$=H or $CH_3$ $R^2$, $R^3$, $R^4$, $R^5$=identical or different aliphatic hydrocarbon radicals having 1 to 8 carbon atoms, especially methyl, or phenyl radicals.

n=2 to 5, preferably 3 m=8 to 80

An example of such a polysiloxane macromonomer which is employed is the α,ω-acryloxy-organofunctional polydimethylsiloxane of the formula

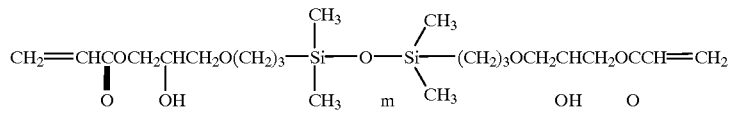

where m≈30 to 50.

Particular preference is given to employing, as polysiloxane macromonomer, an acryloxy-organofunctional siloxane having an acryloxy functionality of <2. An example which may be mentioned is a polysiloxane of the following formula:

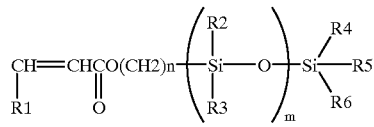

in which m≈8 to 80 and n=1 to 5 and R1 is hydrogen or a methyl group, R2 and R3 are identical or different aliphatic hydrocarbon radicals having 1 to 8 carbon atoms, especially methyl, or a phenyl radical and R4, R5 and R6 are a halogen radical or an alkoxy radical having 1 to 4 carbon atoms or a hydroxyl group.

As component (b5) it is also preferred to employ polysiloxane macromonomers which have been prepared by reacting from 70 to 99.999 mol-% of a compound (1) represented by the formula (I)

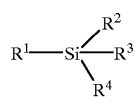
(I)

in which $R^1$ is an aliphatic hydrocarbon group having 1 to 8 carbon atoms or is a phenyl radical and $R^2$, $R^3$ and $R^4$ are each a halogen radical or an alkoxy radical having 1 to 4 carbon atoms or a hydroxyl group, with from 30 to 0.001 mol-% of a compound (2) represented by the formula (II)

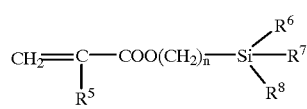
(II)

in which $R^5$ is a hydrogen atom or a methyl radical, $R^6$, $R^7$ and $R^8$ are each halogen, OH— or an alkoxy radical having 1 to 4 carbon atoms, or an aliphatic hydrocarbon group having 1 to 8 carbon atoms, at least one of the radicals $R^6$, $R^7$ or $R^8$ being an OH— group or an alkoxy group and n being an integer from 1 to 6.

Examples of suitable compounds (1) and (2) are given in WO 92/22615 on page 13, line 18 to page 15, line 9.

The reaction between the compounds (1) and (2) is brought about by the dehydrating condensation of the hydroxyl groups which are present in these compounds and/or of the hydroxyl groups which can be attributed to the hydrolysis of the alkoxy groups of these compounds. Depending on the reaction conditions, the reaction comprises—in addition to the dehydration reaction—a dealcoholizing condensation. If the compounds (1) or (2) contain halogen radicals, the reaction between (1) and (2) is realized by dehydrohalogenation.

The conditions under which the reaction between the compound (1) and the compound (2) is carried out are likewise described in the international patent application bearing the international publication no. WO 92/22615 on page 15, line 23 to page 18, line 10.

As component (b5) it is particularly preferred to employ the polysiloxane macromonomer which is commercially available under the designation AK 5 from Toagosei Chemical Industries Co., Ltd. (represented in Germany by the company Marubeni), having from 0.5 to 1.5, on average having one, methacryloyl end group and having a number-average molecular weight of 5000.

Also suitable, furthermore, are epoxy-functional polysiloxane macromonomers of the following formula:

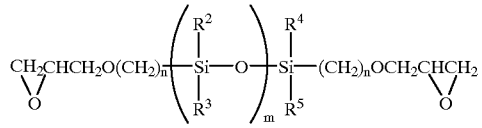

where R2, R3, R4, R5=identical or different aliphatic hydrocarbon radicals having 1 to 8 carbon atoms, especially methyl, or phenyl radicals.

n=2 to 5, preferably 3 m=8 to 80.

With particular preference, the epoxy-functional polydimethylsiloxane of the formula

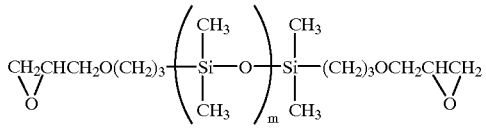

where m=50, having an epoxy equivalent weight of 1900, is employed. This polysiloxane macromonomer is commercially available, for example, under the designation Versuchsprodukt [experimental product] TEGOMER® E-Si 2530 from Th. Goldschmidt.

Also suitable as component (b5), furthermore, are the products commercially available under the following names: Polysiloxanmakromonomer AK 30 from Toagosei Chemical Industries Co., Ltd. (represented in Germany by the company Marubeni) and various products marketed under the designations TEGOMER® E-Si and TEGOMER® V-Si from Th. Goldschmidt.

As component (b6) use is made of vinyl-aromatic hydrocarbons, such as styrene, alpha-alkylstyrenes, such as alpha-methylstyrenes, chlorostyrenes, o-, m-, p-methylstyrene, 2,5-dimethylstyrene, p-methoxystyrene, p-tert-butylstyrene, p-dimethylaminostyrene, p-acetamidostyrene and vinyltoluene, with preference being given to the use of vinyltoluenes and, in particular, of styrene.

As component (b7) it is possible to employ any ethylenically unsaturated monomer which is copolymerizable with (b1), (b2), (b3), (b4), (b5) and (b6), is different from (b1), (b2), (b3), (b4), (b5) and (b6) and is essentially free from carboxyl groups, or mixtures of such monomers. As component (b7) it is preferred to employ alkoxyalkyl acrylates and alkoxyalkyl methacrylates, mono- and polycyclic aliphatic esters of methacrylic acid and/or acrylic acid, preferably cyclohexyl acrylate, cyclohexyl methacrylate, 4-tert-butylcyclohexyl acrylate, 4-tert-butylcyclohexyl methacrylate, isobornyl acrylate and isobornyl methacrylate, especially 4-tert-butylcyclohexyl acrylate and/or 4-tert-butylcyclohexyl methacrylate, vinyl esters and alkyl esters of ethylenically unsaturated carboxylic acids, with the exception of alkyl esters of acrylic acid and methacrylic acid, such as, for example, alkyl esters of crotonic, isocrotonic and maleic acid.

Acrylate resins employed with particular preference are obtained by polymerization of b1) from 5 to 74% by weight, preferably from 5 to 30% by weight, of the component (b1), (b2) from 10 to 40% by weight, preferably from 15 to 25% by weight, of the component (b2), (b3) from 0 to 50% by weight, preferably from 10 to 50% by weight, of the component (b3), (b4) from 0 to 10% by weight, preferably from 0.1 to 6% by weight, of the component (b4), (b5) less than 5% by weight, preferably less than 3% by weight, with particular preference from 0.1 to 1% by weight and, with very particular preference, from 0.3 to 0.7% by weight of the component (b5), (b6) from 5 to 40% by weight, preferably from 10 to 30% by weight, of the component (b6), and (b7) from 0 to 40% by weight, preferably from 0 to 30% by weight, of the component (b7), the sum of the proportions by weight of the components (b1) to (b7) being in each case 100% by weight.

The polyacrylate resins (B) employed in accordance with the invention normally have an OH number of from 60 to 200, preferably from 100 to 160 mg of KOH/g, an acid number of from 1 to 60, preferably 1 to 15 mg of KOH/g and a number-average molecular weight Mn of from 1000 to 5000, preferably from 1500 to 4000, determined in each case by gel permeation chromatography against a polystyrene standard.

The polyacrylate resins (B) employed in accordance with the invention are prepared in an organic solvent or solvent mixture and in the presence of at least one polymerization initiator. Organic solvents and polymerization initiators employed are the solvents and polymerization initiators which are customary for the preparation of polyacrylate resins.

Examples of solvents which can be used are Solvent Naphtha®, heavy benzene, various Solvesso® grades, various Shellsol® grades and Deasol®, and relatively high-boiling aliphatic and cycloaliphatic hydrocarbons, for example various white spirits, mineral turpentine oil, tetralin and decalin, and various alcohols, ethers and esters, for example butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, ethyl 2-hydroxylpropionate and 3-methyl-3-methoxybutanol, and also derivatives based on propylene glycol, for example ethyl ethoxypropionate, methoxypropyl acetate and the like.

Examples of polymerization initiators which can be used are initiators which form free radicals, such as, for example, tert-butyl peracetate, tert-butyl perethylhexanoate, benzoyl peroxide, azobisisobutyronitrile and tert-butyl perbenzoate. The polymerization is expediently carried out at a temperature of from 80 to 200° C., preferably from 110 to 160° C. Use is preferably made as solvents of Shellsol® A, Solvent Naphtha® and butyl acetate.

In order to prepare the polyacrylate resin (B) it is preferred to place at least 60% by weight, particularly preferably 100% by weight, of the overall quantity of component (b3), together with a portion of the solvent, in the initial charge and to heat this initial charge to the respective polymerization temperature. The remaining monomers are then metered in at a uniform rate at the polymerization temperature. If the polysiloxane macromonomers employed as component (b5) are of low reactivity (functionality <2), then likewise preferably at least 60% by weight, particularly preferably 100% by weight, of the overall quantity of this polysiloxane macromonomer (b5) is placed in the initial charge. If, on the other hand, polysiloxane macromoners (b5) of relatively high reactivity are employed (functionality >2), then these polysiloxane macromonomers are preferably added together with the other monomers.

This specific polymerization technique promotes, as is assumed, the copolymerization and reduces the homopolymerization of the individual components. In addition, copolymers having a very low residual monomer content are obtained, which give clear solutions having a high solids content.

The Polyisocyanate Component (C)

The polyisocyanate component (C) comprises any desired organic polyisocyanates having free isocyanate groups attached to aliphatic, cycloaliphatic, araliphatic and/or aromatic structures. Preference is given to employing polyisocyanates having 2 to 5 isocyanate groups per molecule. If desired it is possible to add to the polyisocyanates small quantities of organic solvent, preferably from 1 to 25% by weight based on pure polyisocyanate, in order thus to improve the ease of incorporation of the isocyanate. Solvents suitable as additives for the polyisocyanates are, for example, ethoxyethyl propionate, butyl acetate and the like.

Examples of suitable isocyanates are described, for example, in "Methoden der organischen Chemie" [Methods of organic chemistry], Houben-Weyl, volume 14/2, 4th edition, Georg Thieme Verlag, Stuttgart 1963, page 61 to 70 and by W. Siefken, Liebigs Ann. Chem. 562, 75 to 136. Suitable examples are 1,2-ethylene diisocyanate, 1,4-tetramethylene diisocyanate, 1,6-hexamethylene diisocyanate, 2,2,4- and/or 2,4,4-trimethyl-1,6-hexamethylene diisocyanate, 1,12-dodecane diisocyanate, ω,ω'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate ("isophorone disocyanate", 2,5- and 3,5-bis (isocyanatomethyl)-8-methyl-1,4-methanodecahydronaphthalene, 1,5-2,5-1,6- and 2,6-bis (isocyanatomethyl)-4,7-methanohexahydroindane, 1,5-, 5 2,5-, 1,6- and 2,6-bis(isocyanato)-4,7- methanehexahydroindane, dicyclohexyl 2,4'- and 4,4'-diisocyanate, 2,4- and 2,6-hexahydrotolylene diisocyanate, perhydro-2,4'- and 4,4'-diphenylmethane diisocyanate, ω,ω'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene 1,5-diis-ocyanate, tolylene diisocyanates, such as 2,4- and/or 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylene diisocyanate, but also triisocyanates, such as 2,4,4'-triisocyanatodiphenyl ether, 4,4',4"-triisocyanatotriphenylmethane. Preference is given to the use, if desired in combination with the abovementioned isocyanates, of polyisocyanates having isocyanurate groups and/or biuret groups and/or allophanate groups and/or uretdione groups and/or urethane groups and/or urea groups. Polyisocyanates having urethane groups, for example, are obtained by reacting some of the isocyanate groups with polyols, for example trimethylolpropane and glycerol.

Preference is given to employing aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, or mixtures of these polyisocyanates. Very particular preference is given to employing mixtures of polyisocyanates having uretdione and/or isocyanurate groups and/or allophanate groups, which are based on hexamethylene diisocyanate, such mixtures being those as formed by catalytic oligomerization of hexamethylene diisocyanate using appropriate catalysts. The polyisocyanate component (C) may, moreover, also consist of any desired mixtures of the polyisocyanates mentioned by way of example.

The quantity of the crosslinking agent (C) employed is chosen such that the ratio of the isocyanate groups of the crosslinking agent (C) to the hydroxyl groups of the components (A) and (B) is in the range from 3:1 to 1:3. The coating compositions according to the invention normally contain from 15 to 45%. by weight of resin components (A) and (B) and from 6 to 20% by weight of the crosslinking agent (C), based in each case on the overall weight of the coating composition and on the solids content of the components (A), (B) and (C).

The Coating Compositions

In addition to the components (A), (B) and (C), the novel coating compositions can if desired contain one or more hydroxyl-containing resins, whereby it is possible, for example, to improve further the solvent resistance and the hardness of the resulting coating. For example, they can contain additional hydroxyl-containing acrylate resins and/or polycondensation resins (especially polyesters) which are different from the above-described resins (A) and (B).

These additional binders are normally employed in a quantity of from 0 to 20% by weight, based in each case on the overall weight of the coating composition and on the solids content of the binder. Examples of such suitable additional binders are, for example, the polyacrylate resins available commercially from Hoechst under the name Macrynal® SM 510 and SM 513.

Furthermore, the novel coating compositions contain one or more organic solvents. These solvents are normally employed in quantities of from 20 to 70% by weight, preferably from 25 to 65% by weight, based in each case on the overall weight of the coating composition. Examples of suitable solvents are: aromatic compounds with relatively high degrees of substitution, such as, for example, Solvent Naphtha®, heavy benzene, various Solvesso® grades, various Shellsol® grades and Deasol®, and also relatively high-boiling aliphatic and ycloaliphatic hydrocarbons, for example various white spirits, mineral turpentine oil, tetralin and decalin, and various esters, such as, for example, ethylglycol acetate, butylglycol acetate, ethylglycol diacetate and the like.

The novel coating compositions may, moreover and if desired, also contain customary pigments and/or fillers in customary quantities. In this case the fillers and/or pigments are preferably employed in a quantity of from 0 to 40% by weight, based on the overall weight of the coating composition. Examples of suitable pigments are organic and inorganic color pigments and also metallic and/or special-effect pigments.

The novel coating compositions may, moreover, contain customary auxiliaries and additives in customary quantities, preferably from 0.01 to 10% by weight based on the overall weight of the coating compositions. Examples of such auxiliaries and additives are leveling agents, such as silicone oils, plasticizers, such as phosphates and phthalates, viscosity-controlling additives, matting agents, UV absorbers, light stabilizers and, if desired, fillers.

The coating compositions are prepared in a manner known per se by mixing and, if desired, dispersing the individual components.

These coating compositions can be applied to a substrate in the form of a film by means of spreading, spraying, flow coating, dipping, rolling or knife-coating, the film being subsequently cured to form a firmly adhering coating.

Curing of the coating compositions normally takes place at room temperature or slightly elevated temperature, advantageously at temperatures below 120 degrees C., preferably at temperatures below 80 degrees C., and also preferably at temperatures above 60 degrees C. However, the coating compositions can also be cured under baking conditions, in other words at temperatures of at least 120 degrees C.

Suitable substrates are, in particular, metals and also wood, plastics, glass or the like.

Owing to the short curing times and low curing temperatures, the novel coating compositions are preferably used for automotive refinishing and for the finishing of large-size vehicles and truck bodies. However, depending on the crosslinking agent (C) employed, they can also be employed for the production-line finishing of automobiles. They are suitable, moreover, as clear-coat, especially over a metallic basecoat or a solid-color basecoat, and also, in particular, as pigmented topcoat.

The present invention therefore additionally relates to a process for the production of a multicoat protective and/or decorative coating on a substrate surface, in which (1) a pigmented basecoat is applied to the substrate surface, (2) a polymer film is formed from the basecoat applied in stage (1), (3) a transparent topcoat comprising:

(A) a polyester-modified polyacrylate resin, (B) a hydroxyl-containing polyacrylate resin and (C) a crosslinking agent is applied to the basecoat thus obtained, and then (4) basecoat film and topcoat film are cured together, characterized in that the topcoat employed is the novel coating composition.

The basecoats employed in this process are known and therefore require no more detailed description. Examples of suitable basecoats are found in DE-A-41 10 520, DE-A-40 09 000, DE-A-40 24 204, EP-A-355 433, DE-A-35 45 618, DE-A-38 13 866 and DE-A-42 32 717.

Also suitable are the basecoats described in the published DE-A-43 27 416, which are characterized in that they contain a hydroxyl-containing polyester having a weight-average molecular weight Mw of from 40,000 to 200,000 daltons and a polydispersity Mw/Mn of >8 and in that the polyester has been prepared using at least 50% by weight of aromatic dicarboxylic acids or esterifiable derivatives thereof, but where the content of phthalic anhydride is not more than 80% by weight and the percentages by weight are based in each case on the overall weight of the acid components employed in preparing the polyester.

With the novel coating composition it is also possible to overcoat oxidatively drying, pigmented oxidatively drying and pigmented 2-component polyurethane coating materials which are customarily employed in the field of possibly single-coat automotive refinishing. In this case too, coatings having the desired advantageous properties are obtained.

The examples which follow illustrate the invention in more detail. All parts and percentages are by weight unless expressly stated otherwise.

EXAMPLES

I.1 Preparation of the Polyester Resin a11:

796 parts of trimethylolpropane, 540 parts of isononanoic acid, 821 parts of phthalic anhydride and 83 parts of xylene are placed in a 4 liter polycondensation vessel with stirrer, steam-heated column and water separator and are slowly heated. Condensation is carried out at a temperature of not more than 190 degrees C. to an acid number of 5 mg of KOH/g and a viscosity 8.0 dPas (60% strength in xylene). The mixture is then cooled, diluted at 130 degrees C. with 910 parts of Shellsol® A, and cooled further to room temperature.

The polyester thus obtained has a solids content of 66.5%, an acid number of 5 mg of KOH/g, a (theoretical) OH number of 97.2 mg of KOH/g and a viscosity of 70 dpa·s (original). The number-average molecular weight Mn is 1493, the weight-average molecular weight Mw is 13,243 and the polydispersity Mw/Mn is 8.87 (determined in each case by gel permeation chromatography against a polystyrene standard).

I.2 Preparation of the Polyester Resin a12:

796 parts of trimethylolpropane, 540 parts of isononanoic acid, 821 parts of phthalic anhydride and 83 parts of xylene are placed in a 4 liter polycondensation vessel with stirrer, steam-heated column and water separator and are slowly heated. Condensation is carried out at a temperature of not more than 190 degrees C. to an acid number of 15 mg of KOH/g and a viscosity 5.3 dpa·s (60% strength in xylene). The mixture is then cooled, diluted at 130 degrees C. with 910 parts of Shellsol® A, and cooled further to room temperature.

The polyester thus obtained has a solids content of 66.5%, an acid number of 13 mg of KOH/g, a (theoretical) OH number of 104 mg of KOH/g and a viscosity of 22 dPas (original). The number-average molecular weight Mn is 1241, the weight-average molecular weight Mw is 5843 and the polydispersity Mw/Mn is 4.71 (determined in each case by gel permeation chromatography against a polystyrene standard).

II.1. Preparation of the Polyester-modified Acrylate Resins A1 and A2

Each of the acrylate copolymers was prepared in a 4 liter stainless steel polymerization vessel with stirrer, reflux condenser, a monomer feed and an initiator feed. The components indicated in each case in Table 1 are weighed in and then the initial charge is heated to 165 degrees C.

All feed streams are begun at the same time, with the monomer feed stream being metered in uniformly over the course of 4 h and the initiator feed stream being metered in uniformly over the course of 5 h. During the polymerization, the temperature in the vessel is held at 160–165 degrees C. Thereafter, post-polymerization is carried out for 2 h more. The acrylate resin solution thus obtained has a solids content of 80%. The temperature is subsequently lowered to 120 degrees C. and the acrylate resin is diluted to a solids content of 65% with butyl acetate, and the quantity of benzoic acid indicated in Table 1 or the quantity of tert-butylbenzoic acid or hydroxystearic acid indicated in Table 1 is added.

The quantities of the polyester resin a11 or a12 indicated in Table 1 and the quantity of the commercially available vinyl ester of Versatic acid (commercial product VeoVa 10® from Shell Chemie) indicated in Table 1 are weighed in to the initial charge.

The quantities, indicated in each case in Table 1, of styrene, OH monomer and methyl methacrylate are weighed in to the monomer feed.

14 parts of di-tert-butyl peroxide, 44 parts of Shellsol® A (commercially available aromatic solvent mixture with a boiling range of 165 to 185° C.) and 25 parts of xylene are weighed in to the initiator feed. This composition of the initiator feed stream is employed to prepare all of the acrylate resins.

II.2. Preparation of a Polyester-modified Acrylate Resin A3

The novel acrylate copolymer was prepared in each case in a 4 liter stainless steel polymerization vessel with stirrer, reflux condenser, a monomer feed and an initiator feed. The components of the initial charge, of the monomer feed and of the initiator feed indicated in Table 1 are weighed in and then the initial charge is heated to 165 degrees C.

All feeds are begun at the same time, with the monomer feed stream being metered in uniformly over the course of 4 h and the initiator feed stream being metered in at a uniform rate over the course of 5 h. During the polymerization, the temperature in the vessel is held at 160–165 degrees C. After this, post-polymerization is carried out for 2 h more. The acrylate resin solution thus obtained has a solids content of 80%. At 165 degrees C., 7.5 parts of phthalic anhydride are added and the temperature is maintained at 165 degrees C. for about 2 hours more. The temperature is subsequently lowered to 120 degrees C. and the acrylate resin is diluted with butyl acetate to a solids content of 65%.

The polyacrylate resin obtained in this way has a solids content of 64.4%, an acid number of 4.4 mg of KOH/g, a viscosity of 3.0 dpa·s (55% strength in butyl acetate) and a hydroxyl number of about 90.

Table 1 below indicates the compositions of the polyester-modified polyacrylates A1 to A3:

TABLE 1

| Composition of the polyester-modified poly-acrylates A1 to A3 in parts by weight | | | |
|---|---|---|---|
| | A1 | A2 | A3 |
| a11 | 700 | — | 700 |
| a12 | — | 700 | — |
| VeoVa | 70 | 70 | 70 |

TABLE 1-continued

Composition of the polyester-modified poly-
acrylates A1 to A3 in parts by weight

|         | A1   | A2   | A3   |
|---------|------|------|------|
| Styrene | 350  | 350  | 350  |
| HBA     | 155  | —    | 155  |
| HEMA    | —    | 140  | —    |
| MMA     | 125  | 140  | 125  |
| BA      | 5    | 5    | —    |
| PAA     | —    | —    | 7.5  |

Key to Table 1:
a11, a12 = polyester resin a11 or a12 respectively
VeoVa = commercially available mixture of vinyl esters of saturated aliphatic monocarboxylic acids having preferably 10 carbon atoms, which are branched at the alpha atom
HBA = 4-hydroxy-n-butyl acrylate
HEMA = hydroxyethyl methacrylate
MMA = methyl methacrylate
BA = benzoic acid
PAA = phthalic anhydride

TABLE 2

Characteristics of the polyester-modified
polyacrylates A1 to A3

|        | A1     | A2     | A3     |
|--------|--------|--------|--------|
| SC (%) | 65     | 66     | 64.4   |
| AN     | 5.3    | 4.5    | 4.4    |
| OHN    | 90     | 90     | 90     |
| Visc.  | 2.3    | 2.5    | 3.0    |
| Mn     | 2282   | 2400   | 2282   |
| Mw     | 11,414 | 12,552 | 11,414 |
| Mw/Mn  | 5.00   | 5.23   | 5.00   |

Key to Table 2:
SC = solids content in % by weight
AN = acid number in mg of KOH/g
OHN = OH number in mg of KOH/g
Visc. = viscosity in dPa s
Mn = number-average molecular weight determined by gel permeation chromatography with polystyrene as standard
Mw = weight-average molecular weight determined by gel permeation chromatography with polystyrene as standard
Mw/Mn = polydispersity of the molecular weight distribution III.1. Preparation of the Hydroxyl-containing, Siloxane-modified Acrylate Resins B1 to B3:

Each of the acrylate copolymers is prepared in a 4 liter stainless steel polymerization vessel with stirrer, reflux condenser, a monomer feed and an initiator feed. Each of the components indicated in Table 3 are weighed in and then the initial charge is heated to 145 degrees C.

All of the feeds are begun at the same time, with the monomer feed stream being metered in at a uniform rate over the course of 4 h and the initiator feed stream being metered in at a uniform rate over the course of 4.5 h. The initiator feed ends 30 minutes after the end of the monomer feed. During the polymerization, the temperature in the vessel is held at 142–145 degrees C. After this, post-polymerization is carried out for 2 h more. The acrylate resin solution thus obtained has a solids content of 70%. The temperature is then lowered to 120 degrees C. and the acrylate resin is diluted with the stated solvent mixture to a solids content of 54%.

The quantities, indicated in each case in Table 3, of Shellsol A ® (commercially available aromatic solvent mixture with a boiling range of 165 to 185 degrees C. from Shell Chemie), the quantity indicated in each case in Table 3 of siloxane monomer and the quantity indicated in Table 3 of the commercially available glycidyl ester of Versatic acid (commercial product Cardura E 10 ® from Shell Chemie) are weighed into the initial charge. Into the monomer feed are weighed the quantities, indicated in each case in Table 3, of methyl methacrylate, styrene, OH monomer, acrylic acid and mercaptoethanol.

Into the initiator feed are weighed the quantities, indicated in Table 3, of di-tert-butyl peroxide and xylene.

The solvent mixture used to dilute the acrylate resin

| 334  | parts of xylene |
| 1429 | parts of butyl acetate |
| 60   | parts of Butoxyl (commercially available solvent from Hoechst AG: acetate of 2-methoxybutanol) |
| 128  | parts of butylglycol acetate |

III.2. Preparation of the Hydroxyl-containing Acrylate Resin VB1

The hydroxyl-containing acrylate resin VB1 is prepared in analogy to the preparation of the acrylate resins B1 to B3 but with the difference that the acrylate resin solution obtained after post-polymerization has a solids content of 50±2%. The addition of the solvent mixture, therefore, was unnecessary.

III.3. Preparation of the Hydroxyl-containing Acrylate Resin VB2

The acrylate copolymer VB2 was prepared in each case in a 4 liter stainless steel polymerization vessel with stirrer, reflux condenser, a monomer feed and an initiator feed. The components indicated in each case are weighed in and then the initial charge is heated to 110 degrees C.

All feeds are begun at the same time, with the monomer feed being metered in at a uniform rate over the course of 3 h and the initiator feed being metered in at a uniform rate over the course of 3.5 h. The initiator feed ends 30 minutes after the end of the monomer feed. During the polymerization, the temperature in the vessel is held at 110 degrees C. After this, post-polymerization is carried on for 2 h more. The acrylate solution thus obtained has a solids content of 50±2%.

The polyacrylate resin obtained in this way has a solids content of 51.2%, an acid number of 9.6 g of KOH/g, a viscosity of 60 dpa·s (original) and a hydroxyl number of about 128.

| Initial charge: | |
|---|---|
| 955.5 | parts of xylene |
| 409.5 | parts of butyl acetate |
|       | Monomer feed stream A: |
| 37.7  | parts of Siloxanmakromonomer AK 5 ® (product from Marubeni) (40% strength in methyl ethyl ketone/toluene) |
| 615   | parts of methyl methacrylate |
| 225   | parts of hydroxylethyl [sic] methacrylate |
| 630   | parts of n-butyl methacrylate |
| 15    | parts of acrylic acid |
|       | Initiator feed stream: |
| 37.5  | parts of tert-butyl cumyl peroxide |
| 150   | parts of xylene |

TABLE 3

Composition of the initial charges employed to prepare the siloxane-modified acrylate resins B1 to B3 and to prepare the references VB1 and VB2, and of the monomer feed stream and initiator feed stream, in parts by weight

|  | B1 | B2 | B3 | VB1 | VB2 |
|---|---|---|---|---|---|
| Initial charge. | | | | | |
| Shellsol A | 1537.75 | 1558 | 1585 | 1000 | — |
| BuAc | — | — | — | 408.5 | 409.5 |
| Xylene | — | — | — | — | 955.5 |
| AK5 | 78.75 | 45 | — | 26.75 | — |
| TEGOMER | — | — | 15.75 | — | — |
| Cardura | 1125 | 1125 | 1125 | — | — |
| Monomers | | | | | |
| AK 5 | — | — | — | — | 37.7 |
| MMA | 900 | 900 | 900 | 414 | 615 |
| Styrene | 1318.5 | 1332 | 1334.25 | 585 | — |
| HEMA | 765 | 765 | 765 | 300 | 225 |
| HPMA | — | — | — | 180 | — |
| n-BuMA | — | — | — | — | 630 |
| AA | 360 | 360 | 360 | 10.5 | 15 |
| Mercapt. | 22.5 | 22.5 | 22.5 | 7.5 | — |
| Initiator | | | | | |
| TBCP | 99 | 99 | 99 | 33 | 37.5 |
| Xylene | 396 | 396 | 396 | 132 | 150 |

Key to Table 3:
Cardura ® E 10 = commercially available glycidyl ester of Versatic acid
AK 5 = commercial product Siloxanmakromonomer AK 5 from Marubeni, an α,ω-acryloxy-organofunctional polysiloxane macromonomer having 0.5 to 1.5, on average having one methacryloyl end group and having a number-average molecular weight of 5000.
Tegomer ® = TEGOMER ® E-Si 2530 from Th. Goldschmidt, commercially available α,ω-glycidyl-organofunctional polydimethylsiloxane of the formula $$CH_2CHCH_2O(CH_2)_3 \begin{bmatrix} CH^3 \\ | \\ Si-O \\ | \\ CH_3 \end{bmatrix} \begin{array}{c} CH_3 \\ | \\ Si \\ | \\ CH_3 \end{array} (CH_2)_3OCH_2CHCH_2$$
$$\underset{O}{\diagdown\diagup} \qquad\qquad\qquad\qquad\qquad \underset{O}{\diagdown\diagup}$$

where m = 50, having an epoxy equivalent weight of 1900
HEMA = hydroxyethyl methacrylate
HPMA = hydroxypropyl methacrylate
MMA = methyl methacrylate
AA = acrylic acid
n-BuMa = n-butyl mathacrylate
BuAc = Butyl acetate
Mercapt. = mercaptoethanol
TBCP = tert-butyl cumyl peroxide V. Preparation of the Coating Compositions E1 to E4 and V1 to V4 (Comparison Examples):

IV.1 Preparation of the Curing Agent Solution

Curing agent solutions are prepared from the components indicated below by mixing:

| 4 | parts of catalyst solution according to IV.3 |
|---|---|
| 50.6 | parts of Desmodur ® N 3390 * |
| 10.0 | parts of Solvent naphtha ® |
| 7.5 | parts of xylene |
| 1.5 | parts of n-butyl acetate 98/100 |
| 0.6 | parts of Baysilon ® paint aditive OL44 ** |

-continued

| 14.0 | parts of 1-methoxypropyl 2-acetate |
|---|---|
| 11.0 | parts of butylglycol acetate |

*: Commercially available polyisocyanate from Bayer AG, a 90% strength solution in butyl acetate/solvent naphtha 1:1 of a trimer based on hexamethylene diisocyanate having a number-average molecular weight Mn of about 700 daltons, an average functionality between 3 and 4 and a uretdione group content of not more than 5%;
**: Commercially available leveling agent based on a polyether-modified methylpolysiloxane from Bayer AG.

IV.2. Preparation of an Adjustment Additive
An adjustment additive is prepared by mixing the components indicated below:

| 15.0 | parts of xylene |
|---|---|
| 13.0 | parts of Solventnaphtha ® |
| 10.0 | parts of petroleum spirit 135/180 |
| 3.0 | parts of butylglycol acetate |
| 50.0 | parts of n-butyl acetate 98/100 |
| 5.0 | parts of 1-methoxypropyl acetate |
| 2.0 | parts of Butoxyl |
| 2.0 | parts of dipentenes |

IV.3 Preparation of a Catalyst Solution
1.0 parts of dibutyltin dilaurate are mixed with 50 parts of butyl acetate and 49 parts of xylene.

IV.4 Preparation of the Topcoats E1 to E4 and V1 to V4
The topcoats are prepared by adding 40 parts of the hydroxyl-containing, polyester-modified polyacrylate resin A and 3 parts of butyl acetate 98/100 and 6 parts of an organic red pigment (commercial product Novopermrot® F2RK from Hoechst AG). The mixture is then subjected to the action of a dissolver at 2000 rpm for 10 minutes, first of all, and then ground, with cooling, to a Hegmann fineness of <10 micrometers. Thereafter, a mixture of 4 parts of butyl acetate 98/100, 20 parts of the hydroxyl-containing, siloxane-modified polyacrylate B (or, respectively, of a non-siloxane-modified polyacrylate of the type Macrynal® SM 510 from Hoechst AG), 0.5 parts of a commercially available light stabilizer based on a sterically hindered amine (commercial product Tinuvin® 292 from Ciba Geigy), 0.5 parts of the catalyst solution described under IV.3 and 26 parts of the hydroxyl-containing, polyester-modified polyacrylate resin A is added and the mixture is homogenized using a stirrer. Table 4 lists the proportions of the respective components A and B in the coating formulations.

TABLE 4

Proportions of components A and B in the coating formulations

| Coating formulation | E1 | E2 | E3 | E4 | V1 | V2 | V3 | V4 |
|---|---|---|---|---|---|---|---|---|
| Component A (each 66% by weight) | A1 | A1 | A1 | A3 | A2 | A1 | A1 | A1 |
| Component B (each 20% by weight) | B1 | B2 | B3 | B1 | M | VB1 | VB2 | M |

M = Macrynal SM 510

To prepare each of the topcoats, 4 parts by volume of the resulting mixture are mixed with 1 part by volume of the curing agent solution described under IV.1 and 1 part by volume of the adjustment additive described under IV.2.

IV.5 Application and Testing of the Topcoats
The topcoats obtained in this way are applied to phosphatized and filler-treated steel panels. The phosphatized steel panels are for this purpose coated with a commercially available, conventional filler (commercial product Glasurit® Grundfüller [primer surfacer] 283–1874 from BASF Lacke +Farben AG) based on a binder containing epoxide groups and on an amino-functional curing agent, and are dried at room temperature for 1 h.

The topcoat is then applied in 2 spray passes with an intermediate flash-off time of 15 minutes and dried at 20° C. for 16 h. The dry-film thickness is from 50 to 60 micrometers.

The panels coated in this way are then subjected to the tests described below:

1. Surface Drying—Masking Test

The topcoat is applied to a filler-treated steel panel in accordance with the application instructions. After drying, a strip of Tesakrepp (5 cm in width) and a "Regupak" inscription film are applied.

In order to insure defined pressing-on, the strip of Tesakrepp is rolled over twice with a pressing roller and the "Regupak" film is pressed on by hand so as to be free from bubbles.

A piece of Tesakrepp strip and, respectively, film is removed after 1 h, 3 h, 6 h and 24 h, and the marking on the coated surface is assessed immediately and after 60 minutes.
Evaluation:

| Marking | Index number acc. to DIN 53320 |
| --- | --- |
| not marked | 0 |
| very slightly marked | 1 |
| slightly marked | 2 |
| marked | 3 |
| heavily marked | 4 |
| very heavily marked | 5 |

2. Leveling

The steel panels are prepared in a manner similar to that for the masking test and are assessed visually.
Evaluation:

| Leveling | Index number acc. to DIN 53320 |
| --- | --- |
| excellent | 0 |
| very good | 1 |
| good | 2 |
| moderate | 3 |
| poor | 4 |
| very poor | 5 |

3. Spray Mist Uptake

Filler-treated panels are used having 6 holes with a diameter of 8 mm in the central region of the panel. After two conventionally applied spray passes, the topcoat is sprayed a third time in a wedge formation from left to right, i.e. left—thick coat applied, right—thin coat applied. After 30 minutes a spray mist is projected into the right-hand half of the panel. During spray application and drying, the panels hang vertically.

For evaluation, the filler-treated panels are located on an inclined holding device at an angle of 30 degrees.

The right-hand side of the filler-treated panels is assessed visually.

| Spray mist uptake | Index number acc. to DIN 53320 |
| --- | --- |
| excellent | 0 |
| very good | 1 |
| good | 2 |
| moderate | 3 |
| poor | 4 |
| very poor | 5 |

4. Solvent Resistance

Test panels are prepared in analogy to the masking test.

A paper towel is soaked with the solvent and is wiped with 10 double strokes under gentle pressure over the surface. The area is then dried with a separate cloth and the degree of matting is assessed visually straight away.
Evaluation:

| Matting | Index number acc. to DIN 53320 |
| --- | --- |
| excellent | 0 |
| very good | 1 |
| good | 2 |
| moderate | 3 |
| poor | 4 |
| very poor | 5 |

5. Slippage Resistance

Test panels are prepared in a manner similar to that of the masking test.

A standard testing body of 200 g in weight, into which 3 balls have been embedded half-way, is drawn over the test panels over a path of 5 cm. The sliding friction produced is recorded as an analog signal on a plotter. The so-called "Altek" value is a measure of the sliding friction correlated with the plotter signal.

TABLE 5

The test results

| | Test method Masking test | | Leveling | Spray mist | Solvent resistance | Altek |
| --- | --- | --- | --- | --- | --- | --- |
| Topcoat | Tesa | Regupak | | | | |
| E1 | 1–2 | 1–2 | 3 | 2 | 1 | 0.194 |
| E2 | 3 | 3 | 2–3 | 2 | 2 | 0.210 |
| E3 | 2 | 2 | 3 | 2 | 1 | 0.198 |
| E4 | 1–2 | 1–2 | 3 | 2 | 1 | 0.197 |
| V1 | 5 | 5 | 2 | 2 | 5 | 0.295 |
| V2 | 3 | 3 | 5 | 4 | 2 | 0.215 |
| V3 | 3 | 3 | 5 | 4 | 2 | 0.218 |
| V4 | 1–2 | 1–2 | 3 | 2 | 1 | 0.238 |

What is claimed is:

1. A coating composition comprising
   (A) from 5 to 60% by weight of at least one polyester-modified polyacrylate resin consisting of:
      (a1) from 20 to 60% by weight of at least one polyester and
      (a2) from 40 to 80% by weight of at least one hydroxyl-containing polyacrylate resin which has been prepared at least in part in the presence of component (a1),
   (B) from 1 to 35% by weight of at least one hydroxyl-containing, siloxane-modifed polyarylate resin, consisting of:

(b1) an essentially carboxyl-free (meth)acrylic ester which is different from (b2), (b3), (b4), (b5), (b6), and (b7) and is copolymerizable with (b2), (b3), (b4), (b5), (b6), and (b7), or a mixture of such monomers, (b2) an ethylenically unsaturated monomer which carries at least one hydroxyl group per molecule, is essentially free from carboxyl groups, is copolymerizable with (b1), (b3), (b4), (b5), (b6), and (b7) and is different from (b3), or a mixture of such monomers, (b3) if desired, at least one reaction product of acrylic acid and/or methacrylic acid with the glycidyl ester of an alpha-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an alpha-branched monocarboxylic acid having 5 to 18 carbon atoms per molecule, (b4) if desired, an ethylenically unsaturated monomer which carries at least one carboxyl group per molecule and is copolymerizable with (b1), (b2), (b3), (b5), (b6), and (b7), or a mixture of such monomers, (b5) a polysiloxane macromonomer having a number-average molecular weight Mn of from 1000 to 40,000 daltons, and on average from 0.5 to 2.5 ethylenically unsaturated double bonds per molecule or having on average from 0.5 to 2.5 epoxide groups per molecule, or a mixture of such macromonomers, (b6) a vinyl-aromatic hydrocarbon or a mixture of different vinyl-aromatic hydrocarbons, and (b7) if desired, an ethylenically unsaturated monomer which is copolymerizable with (b1), (b2), (b3), (b4), (b5) and (b6), is different from (b1), (b2), (b3), (b4), (b5), and (b6) and is essentially free from carboxyl groups, or a mixture of such monomers, (C) from 5 to 50% by weight of an isocyanate crosslinking agent, and from 0.1 to 1% by weight, based on the weight of component (A) without solvents, of at least one member selected from the group consisting of aromatic monocarboxylic acids, polycarboxylic aromatic acids, anhydrides of aromatic polycarboxylic acids, and mixtures thereof, which at least one member is added to the component (A) after its preparation or to the coating composition.

2. The coating composition of claim 1, comprising less than 3% by weight of component (b5), based on the overall weight of the monomers employed to prepare the polyacrylate resin (B).

3. The coating composition of claim 1, comprising polyacrylate resin (B) prepared by polymerizing (b1) from 5 to 74% by weight of the component (b1), (b2) from 10 to 40% by weight of the component (b2), (b3) from 0 to 50% by weight of the component (b3), (b4) from 0 to 10% by weight of the component (b4), (b5) less than 3% by weight of the component (b5), (b6) from 5 to 40% by weight of the component (b6), (b7) from 0 to 40% by weight of the component (b7), the sum of the proportions by weight of the components (b1) to (b7) being 100% by weight.

4. The coating composition of claim 1, comprising polyacrylate resin (A) consisting of:

1.) polyester (a1) having an OH number of between 90 and 130 mg of KOH/g, an acid number of less than 10 mg of KOH/g, a number average molecular weight Mn of between 1300 and 3500 daltons and a polydispersity of between 5 and 50, 2.) polyacrylate resin (a2) comprising, incorporated by polymerization, one or more monomers selected from the group consisting of 4-hydroxy-n-butyl acrylate, 4-hydroxy-n-butyl methacrylate, 3-hydroxy-n-butyl acrylate, 3-hydroxy-n-butyl methacrylate, hydroxyethyl methacrylate, and mixtures thereof, and 3.) polyacrylate resin (a2) having an OH number of between 50 and 150 mg of KOH/g and an acid number of between 0 and 10 mg KOH/g.

5. The coating composition of claim 1, wherein polyacrylate resin (A) consists of:

from 30 to 50% by weight of (a1) and from 50 to 70% by weight of (a2).

6. The coating composition of claim 1, wherein polyacrylate resin (a2) is obtained by polymerizing:

(a) from 5 to 50% by weight of one or more monomers selected from the group consisting of 4-hydroxy-n-butyl (meth)acrylate, 3-hydroxy-n-butyl (meth)acrylate, hydroxyethyl methacrylate, and mixtures thereof, (b) from 0 to 50% by weight of one or more hydroxyl-containing, ethylenically unsaturated, copolymerizable monomers which are different from (a), (c) from 5 to 95% by weight of a monomer which is different from (a) and (b) and is selected from the group consisting of an aliphatic ester of acrylic acid an aliphatic ester of methacrylic acid, a cycloaliphatic ester of acrylic acid, a cycloaliphatic ester of methacrylic acid, and mixtures thereof, (d) from 0 to 30% by weight of a copolymerizable vinyl ester which is different from (a), (b) and (c), or of a mixture of such monomers, (e) from 0 to 85% by weight of a vinyl-aromatic hydrocarbon which is different from (a), (b), (c) and (d), or of a mixture of such monomers, and (f) from 0 to 10% by weight of a further ethylenically unsaturated monomer which is different from (a), (b), (c), (d) and (e), or of a mixture of such monomers at least partially in the presence of the component (a1), the sum of the proportions by weight of the monomers (a) to (f) being in each case 100% by weight.

7. The coating composition of claim 1, wherein after the preparation of component (A), a member selected from the group consisting of benzoic acid, alkyl-substituted benzoic acid, alkoxy-substituted benzoic acid phthalic anhydride, and mixtures thereof, are added to it.

8. The coating composition of claim 1, wherein at least 40% by weight of component (a2) has been prepared in the presence of the component (a1).

9. The coating composition of claim 1, wherein component (C) comprises a member selected from the group consisting of a diisocyanate, cyanate, and mixtures thereof.

10. The coating composition of claim 2, comprising between 0.1 and 1% by weight of component (b5), based on the overall weight of the monomers employed to prepare the polyacrylate resin (B).

11. The coating composition of claim 10, comprising between 0.3 and 0.7% by weight of component (b5), based on the overall weight of the monomers employed to prepare the polyacrylate resin (B).

12. The coating composition of claim 3, comprising polyacrylate resin (B) prepared by polymerizing (b1) from 5 to 30% by weight of the component (b1), (b2) from 15 to 25% by weight of the component (b2),
(b3) from 10 to 50% by weight of the component (b3),
(b4) from 0.1 to 6% by weight of the component (b4),
(b5) from 0.1 to 1% by weight of the component (b5),
(b6) from 10 to 30% by weight of the component (b6),
(b7) from 0 to 30% by weight of the component (b7),
the sum of the proportions by weight of the components (b1) to (b7) being 100% by weight.

13. The coating composition of claim 11, comprising polyacrylate resin (B) prepared by polymerizing
(b1) from 5 to 30% by weight of the component (b1),
(b2) from 15 to 25% by weight of the component (b2),
(b3) from 10 to 50% by weight of the component (b3),
(b4) from 0.1 to 6% by weight of the component (b4),
(b5) from 0.3 to 0.7% by weight of the component (b5),
(b6) from 10 to 30% by weight of the component (b6),
(b7) from 0 to 30% by weight of the component (b7),
the sum of the proportions by weight of the components (b1) to (b7) being 100% by weight.

14. The coating composition of claim 6, wherein polyacrylate resin (a2) is obtained by polymerizing:
(a) from 10 to 35% by weight of one or more monomers selected from the group consisting of 4-hydroxy-n-butyl (meth)acrylate, 3-hydroxy-n-butyl (meth)acrylate, hydroxyethyl methacrylate, and mixtures thereof,
(b) from 0 to 30% by weight of one or more hydroxyl-containing, ethylenically unsaturated, copolymerizable monomers which are different from (a),
(c) from 15 to 55% by weight, of a monomer which is different from (a) and (b) and is selected from the group consisting of an aliphatic ester of acrylic acid, an aliphatic ester of methacrylic acid, a cycloaliphatic ester of acrylic acid, a cycloaliphatic ester of methacrylic acid, and mixtures thereof,
(d) from 5 to 15% by weight, of a copolymerizable vinyl ester which is different from (a), (b) and (c), or of a mixture of such monomers,
(e) from 15 to 60% by weight, of a vinyl-aromatic hydrocarbon which is different from (a), (b), (c) and (d), or of a mixture of such monomers, and
(f) from 0 to 8% by weight, of a further ethylenically unsaturated monomer which is different from (a), (b), (c), (d) and (e), or of a mixture of such monomers,
at least partially in the presence of the component (a1), the sum of the proportions by weight of the monomers (a) to (f) being in each case 100% by weight.

15. The coating composition of claim 7, wherein, after the preparation of component (A), benzoic acid is added to it.

16. The coating composition of claim 9, wherein component (C) comprises at least one member selected from the group consisting of isocyanurate group-containing diisocyanate, isocyanurate group-containing polyisocyanate, and mixtures thereof.

17. A process for the preparation of a coated substrate, the process comprising:
providing a substrate,
applying a coating to the substrate to provide a coated substrate, the coating comprising
(A) from 5 to 60% by weight of at least one polyester-modified polyacrylate resin consisting of:
(a1) from 20 to 60% by weight of at least one polyester and
(a2) from 40 to 80% by weight of at least one hydroxyl-containing polyacrylate resin which had been prepared at least in part in the presence of component (a1),
(B) from 1 to 35% by weight of at least one hydroxyl-containing, siloxane-modified polyacrylate resin, consisting of:
(b1) an essentially carboxyl-free (meth)-acrylic ester which is different from (b2), (b3), (b4), (b5), (b6), and (b7) and is copolymerizable with (b2), (b3), (b4), (b5), (b6), and (b7), or a mixture of such monomers,
(b2) an ethylenically unsaturated monomer which carries at least one hydroxyl group per molecule, is essentially free from carboxyl groups, is copolymerizable with (b1), (b3), (b4), (b5), (b6), and (b7) and is different from (b3), or a mixture of such monomers,
(b3) if desired, at least one reaction product of acrylic acid and/or methacrylic acid with the glycidyl ester of an alpha-branched monocarboxylic acid having 5 to 18 carbon atoms per molecule or, instead of the reaction product, an equivalent quantity of acrylic and/or methacrylic acid which then, during or after the polymerizarion reaction, is reacted with the glycidyl ester of an alpha-branched monocarboxylic acid having 5 to 18 carbon atoms per molecule,
(b4) if desired, an ethylenically unsaturated monomer which carries at least one carboxyl group per molecule and is copolymerizable with (b1), (b2), (b3), (b5), (b6), and (b7), or a mixture of such monomers,
(b5) a polysiloxane macromonomer having a number-average molecular weight Mn of from 1000 to 40,000 daltons and on average from 0.5 to 2.5 ethylenically unsaturated double bonds per molecule or having on average from 0.5 to 2.5 epoxide groups per molecule, or a mixture of such macromonomers,
(b6) a vinyl-aromatic hydrocarbon or a mixture of different vinyl-aromatic hydrocarbons, and
(b7) if desired, an ethylenically unsaturated monomer which is copolymerizable with (b1), (b2), (b3), (b4), (b5), and (b6), is different from (b1), (b2), (b3), (b4), (b5) and (b6) and is essentially free from carboxyl groups, or a mixture of such monomers, and
(C) from 5 to 50% by weight of an isocyanate crosslinking agent, and from 0.1 to 1% by weight, based on the weight of component (A) without solvents, of at least one member selected from the group consisting of aromatic monocarboxylic acids, polycarboxylic aromatic acids, anhydrides of aromatic polycarboxylic acids, and mixtures thereof, which at least one member is added to the component (A) after its preparation or to the coating composition.

18. The process of claim 17, wherein the coating is a topcoat.

19. The process of claim 18, wherein the topcoat is a solid color.

20. The process of claim 17, wherein the substrate is a previously coated substrate.

21. The process of claim 20, wherein the substrate is a previously coated automotive substrate.

22. The process of claim 17, wherein the coating comprises a protective and/or decorative coating.

23. A coating composition comprising (A) from 5 to 60% by weight of at least one polyester-modified polyacrylate resin consisting of:
- (a1) from 20 to 60% by weight of at least one polyester and
- (a2) from 40 to 80% by weight of at least one hydroxyl-containing polyacrylate resin which has been prepared at least in part in the presence of component (a1), (B) from 1 to 35% by weight of at least one hydroxyl-containing, siloxane-modifed polyacrylate resin, consisting of:
- (b1) an essentially carboxyl-free (meth)acrylic ester which is different from (b2), (b3), (b4), (b5), (b6), and (b7) and is copolymerizable with (b2), (b3), (b4), (b5), (b6), and (b7), or a mixture of such monomers,
- (b2) an ethylenically unsaturated monomer which carries at least one hydroxyl group per molecule, is essentially free from carboxyl groups, is copolymerizable with (b1), (b3), (b4), (b5), (b6), and (b7) and is different from (b3), or a mixture of such monomers,
- (b3) if desired, at least one reaction product of acrylic acid and/or methacrylic acid with the glycidyl ester of an alpha-branched monocarboxylic acid having 5 to 18 carbon atoms per molecule or, instead of the reaction product, an equivalent quantity of acrylic and/or methacrylic acid which then, during or after the polymerization reaction, is reacted with the glycidyl ester of an alpha-branched monocarboxylic acid having 5 to 18 carbon atoms per molecule,
- (b4) if desired, an ethylenically unsaturated monomer which carries at least one carboxyl group per molecule and is copolymerizable with (b1), (b2), (b3), (b5), (b6), and (b7), or a mixture of such monomers,
- (b5) from 0.1 to less than 3% by weight of a polysiloxane macromonomer having a number-average molecular weight Mn of from 1000 to 40,000 daltons, and on average from 0.5 to 2.5 ethylenically unsaturated double bonds per molecule or having on average from 0.5 to 2.5 epoxide groups per molecule, or a mixture of such macromonomers,
- (b6) a vinyl-aromatic hydrocarbon or a mixture of different vinyl-aromatic hydrocarbons, and
- (b7) if desired, an ethylenically unsaturated monomer which is copolymerizable with (b1), (b2), (b3), (b4), (b5) and (b6), is different from (b1), (b2), (b3), (b4), (b5), and (b6) and is essentially free from carboxyl groups, or a mixture of such monomers, and (C) from 5 to 50% by weight of an isocyanate crosslinking agent.

* * * * *